F. LYTTLE.
JUICE EXTRACTOR.
APPLICATION FILED DEC. 29, 1917.

1,290,262.

Patented Jan. 7, 1919.
2 SHEETS—SHEET 1.

Witnesses

Inventor
Frances Lyttle
By Victor J. Evans
Attorney

F. LYTTLE.
JUICE EXTRACTOR.
APPLICATION FILED DEC. 29, 1917.
1,290,262.
Patented Jan. 7, 1919.
2 SHEETS—SHEET 2.
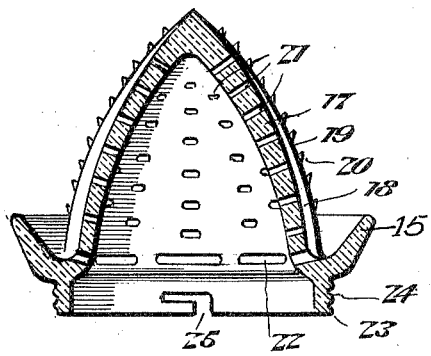
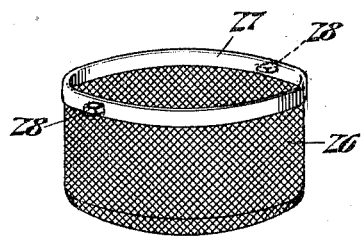
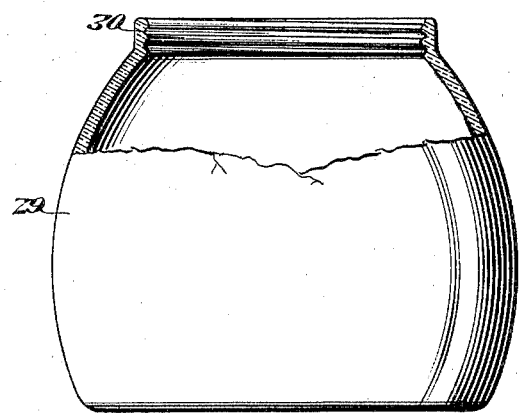
Witnesses
Inventor
Frances Lyttle
By Victor J. Evans
Attorney

UNITED STATES PATENT OFFICE.

FRANCES LYTTLE, OF PASADENA, CALIFORNIA.

JUICE-EXTRACTOR.

1,290,262.   Specification of Letters Patent.   Patented Jan. 7, 1919.

Application filed December 29, 1917. Serial No. 209,514.

*To all whom it may concern:*

Be it known that I, FRANCES LYTTLE, a citizen of the United States, residing at Pasadena, in the county of Los Angeles and State of California, have invented new and useful Improvements in Juice-Extractors, of which the following is a specification.

This invention relates to juice extractors designed especially for the purpose of extracting the juice of lemons and other citrus fruits and it has for its object to produce a simple, improved and effective device whereby the juice of such fruits may be extracted and strained at a single operation.

A further object of the invention is to produce a simple and improved device of the character described including a pulp macerator, a strainer, and a juice receptacle, together with means whereby the several instrumentalities may be readily disconnected or assembled in position for operation.

Further objects of the invention are to simplify and improve the parts entering into the construction of the complete device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention.

In the drawings,—

Fig. 3 is a sectional detail view of the pulp macerator detached.

Fig. 4 is a detail view of the strainer.

Fig. 5 is a side view partly in section of the juice receptacle or bowl.

Corresponding parts in the several figures are denoted by like characters of reference.

Figure 1:
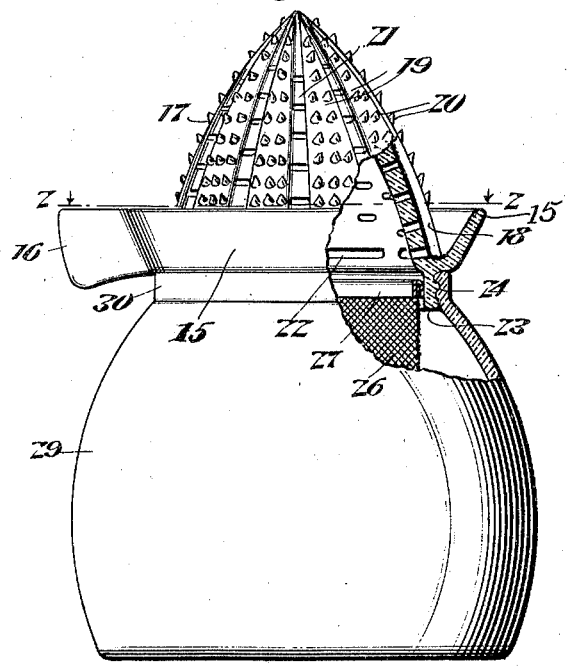
Figure 1 is a view partly in side elevation and partly in section of a device constructed in accordance with the invention.
Figure 2:
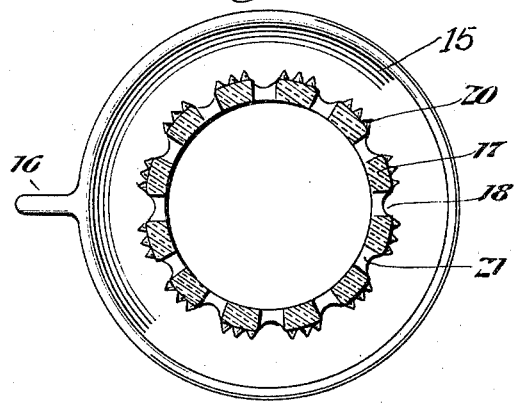
Fig. 2 is a sectional view taken on the line 2—2 in Fig. 1.

The pulp macerator consists of a saucer shaped vessel 15 having a handle 16 and from which rises a conical projection 17, said projection or cone being provided on the outer face thereof with substantially vertical grooves or channels 18 and intermediate ribs 19, said ribs being preferably provided with spurs 20. The conical projection is hollow and the grooves 18 are provided at intervals with transverse slots 21 through which juice may pass to the interior of the cone. Such juice as does not pass through the slots 21 will be guided through the channels 18 to the saucer 15 the bottom of which, adjacent to the face of the cone, is provided with elongated slots 22.

The saucer shaped vessel 15 is provided with a downwardly extending annular bead or flange 23, said flange being formed with screw threads 24 on the external face thereof. On the internal face of the flange 23, at diametrically opposite sides thereof are formed bayonet slots 25. A cup shaped strainer 26 is provided, the same being preferably made of wire fabric which is reinforced at the top edge thereof by a band 27 having projections 28 at diametrically opposite sides thereof for engagement with the bayonet slots 25, thus enabling the strainer to be detachably assembled with the macerator.

29 designates a bowl or receptacle made preferably of glass and with upwardly convergent side walls, said bowl being provided at the mouth thereof with an upwardly extending bead or flange 30, threaded on the inner face thereof for engagement with the thread on the outer face of the bead or flange 23. The macerator as well as the bowl or receptacle is preferably made of glass.

In the operation of this device the strainer is assembled with the macerator and is inserted within the bowl with which the macerator is threadedly engaged, thus maintaining all the parts of the device securely in assembled relation when in use. After cutting a fruit in half it may be engaged in the customary manner with the conical portion of the macerator, the fruit being turned about, causing the cells of the pulp to become broken and enabling the juice to pass through the slots 21 and also to be guided through the channels 18 to the slots 22, passing from thence to the strainer. The seeds and other coarse parts will be retained in the saucer shaped receptacle 15 while the juice will pass through the strainer to the bowl or receptacle. The upwardly convergent side walls of the bowl will provide ample space for the passage of the juice through the side walls of the strainer without danger of escaping in an upward direction. After use, the parts of the device may be very conveniently disassembled, cleaned and put away for future use.

What is claimed is:—

1. In a device of the class described, a saucer shaped vessel having a conical macerating projection and a depending flange, a receptacle having an opening in its top, said opening and the flange of the saucer shaped vessel having inter-engaging threads, and a cup shaped strainer fitting within and detachably connected with the flange of the saucer shaped vessel and depending from said flange.

2. In a device of the class described, a saucer shaped vessel having a conical macerating projection and with a downwardly extending flange, a receptacle having upwardly converging side walls and a flange surrounding the mouth thereof, said flange and the flange of the saucer shaped vessel having interengaging threads, and a cup shaped strainer fitting within and detachably connected with the flange of the saucer shaped vessel, said strainer projecting within the bowl or receptacle when the parts are assembled.

In testimony whereof I affix my signature.

FRANCES LYTTLE.